United States Patent [19]

Neuner et al.

[11] Patent Number: 4,631,537
[45] Date of Patent: Dec. 23, 1986

[54] METHOD FOR TEMPERATURE COMPENSATING A ROD POSITION INDICATION SYSTEM

[75] Inventors: James A. Neuner, Richland Township, Lebanon County; Dirk J. Boomgaard, Monroeville; Susan A. Wilbur, Wilkins Township, Allegheny County; Charles G. Geis, N. Huntington, all of Pa.

[73] Assignee: Westinghouse Electric Corp., Pittsburgh, Pa.

[21] Appl. No.: 606,421

[22] Filed: Sep. 2, 1984

[51] Int. Cl.[4] ............................................. G08C 19/08
[52] U.S. Cl. ................................ 340/870.17; 340/501
[58] Field of Search ................... 340/870.17, 501, 686, 340/870.36; 376/258; 374/6, 55; 336/55, 30

[56] References Cited

U.S. PATENT DOCUMENTS

| | | | |
|---|---|---|---|
| 2,772,383 | 11/1956 | Bradley et al. | 336/55 X |
| 2,917,445 | 12/1959 | Oakes et al. | 340/686 X |
| 3,441,834 | 4/1969 | Moskowitz et al. | 340/870.17 X |
| 3,846,771 | 11/1974 | Young et al. | 340/195 |
| 3,893,090 | 7/1975 | Neuner et al. | 340/188 |

FOREIGN PATENT DOCUMENTS

| | | |
|---|---|---|
| 1106730 | 3/1968 | United Kingdom . |
| 1422613 | 1/1976 | United Kingdom . |
| 1426211 | 2/1976 | United Kingdom . |
| 1512289 | 6/1978 | United Kingdom . |

Primary Examiner—Jerry W. Myracle
Attorney, Agent, or Firm—Daniel C. Abeles

[57] ABSTRACT

A method for temperature compensating a position indicator which includes a sensor for producing an output signal whose magnitude corresponds to the position of an element that is linearly movable between first and second positions and which is subject to changes in temperature within a given temperature range and wherein the output signal of the sensor contains a temperature variable offset component and the rate of increase of the output signal as the element moves from the first to the second position fluctuates with changes in temperature. The method includes measuring the temperature of the medium; generating an electrical representation of an offset correction, relative to a reference temperature, required in the offset component of the output signal of the sensor at the temperature of the element; generating electrical representations of a rate correction factor, relative to a reference temperature, required for the rate of increase in the output signal of the sensor at the temperature of the element; causing the sensor to produce an output signal corresponding to the position of the element; and compensating the output signal of the sensor by forming an electrical representation of the product of the sensor output signal and the rate correction factor at the measured temperature of the medium, and adding to such product the offset correction at the measured temperature of the medium.

4 Claims, 9 Drawing Figures

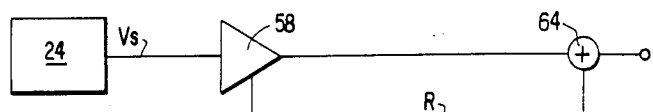
FIG. 7
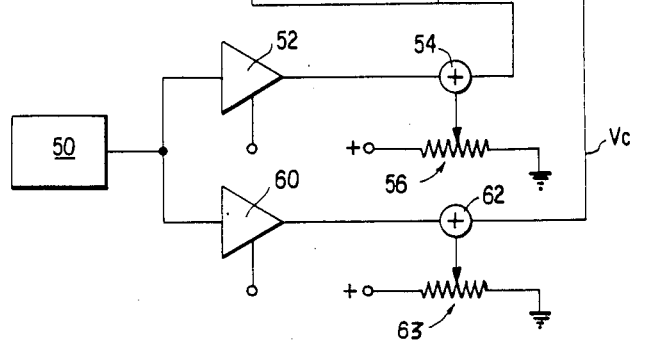
FIG. 8
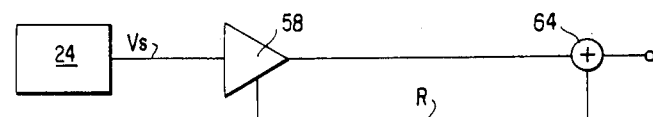
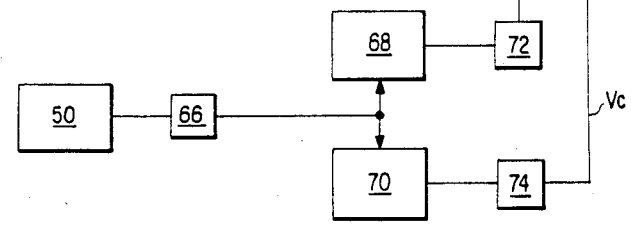
FIG. 9
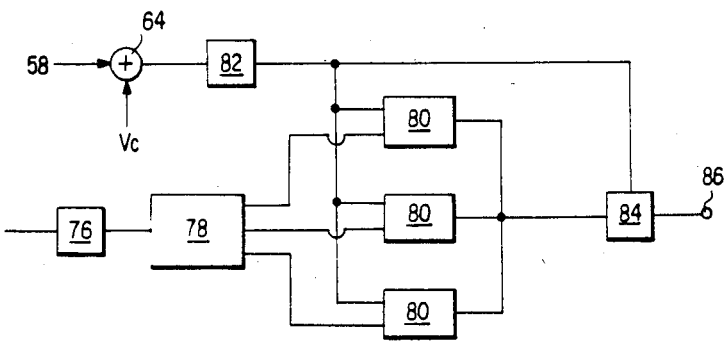

METHOD FOR TEMPERATURE COMPENSATING A ROD POSITION INDICATION SYSTEM

BACKGROUND OF THE INVENTION

1. Field of the Invention

The invention relates to a position indication system for an element, such as a rod, which is movable in a direction along its longitudinal axis, and more specifically to a method for temperature compensating a position indication system which determines the relative position of a control rod within the core of a nuclear reactor.

2. Description of the Prior Art

There are a great number of applications requiring remote monitoring of the position of an elongated movable metallic member having one degree of freedom along its longitudinal axis. For example, in the nuclear art it is necessary to raise and lower control rods within the reactor core for controlling the energy output of the nuclear reactor. The use of the term "control rod" is used herein to include any member positioned within the reactor which alters the reactivity of the reactor. Thus, this includes rods which serve other purposes besides normal control use. The sue of the word "rod" is synonymous with "control rod" for the purposes of this invention.

The control rods are located within proximity of nuclear fuel elements comprising nuclear fissionable material. Generally, the greater the number of neutrons within the core of the reactor, the greater the number of fissions of the fuel atoms that take place, and consequently, the greater the amount of energy released. Energy, in the form of heat, is removed from the reactive region by a coolant which flows through the region and then flows to a heat exchanger wherein the heat from the reactor coolant is used to generate steam for driving turbines to transform heat energy into electrical energy. To decrease the energy output of the nuclear reactor, the control rods, made of materials which absorb neutrons, are inserted within the reactive region, commonly known as the nuclear core. The greater the number of control rods and the further the control rods are inserted within the reactive region, the greater the number of neutrons that will be absorbed and hence the energy output of the reactor will decrease. Conversely, to increase the energy output of the reactor, the nuclear control rods are withdrawn from the reactive region. Consequently, the number of neutrons absorbed decreases, the number of fissions increase, and the energy output of the reactor increases.

For pressurized water reactors, it is of the utmost importance to know the accurate position of each of the control rods. Differences of over 15 inches between neighboring rods adversely affect fuel management. In addition, knowledge of the position of the rods versus thermal power output gives an indication of the condition of the reactor, thus, the degree of fuel burnup. Therefore, extremely reliable control rod drive and position monitoring systems must be employed in order to maintain the safe and reliable operating status of the reactor.

One system presently employed to lower and raise the control rods utilizes a jack-type electromechanical mechanism which employs a plurality of electrical coils to incrementally insert or withdraw each control rod within the reactor. Such a system is more fully described in U.S. Pat. No. 3,158,766 issued to E. Frisch and assigned to the assignee of the present invention.

In a pressurized water reactor three mechanisms are generally available for providing an indication of rod position; a step counter, a movable in-core flux-mapping system and a rod position indication system.

The step counter provides an indirect measurement by electrically counting the number of mechanical steps commanded by the rod control system. As an indirect measurement system, it cannot detect mechanical malfunctions that prevent rod movement when commanded.

The movable in-core flux-mapping system does provide direct measurement of control rod position as it is moved in a thimble close to the rod of interest. However, it is used for this purpose only as a backup system because of the mechanical wear and operator interaction problems associated with its continual use. Therefore, the rod position indication system is the primary means of direct measurement of control rod position.

As previously described, the control rods move within a pressure vessel and are attached to drive rods, which can be incrementally moved in a forward or reverse direction by a drive mechanism, such as the magnetic jack mechanism described in the cited Frisch patent. The drive rod extends longitudinally through the pressure vessel, along the axis of movement of the control rod, into the sealed, pressurized environment of the rod travel housing. Since it is of the utmost importance to maintain the sealed integrity of the pressurized vessel, mechanical penetrations are kept at a minimum to reduce the likelihood of loss of the pressurized environment contained therein. Accordingly, no mechanical penetrations are permitted for detecting the relative position of the control rods within the core of the reactor. Inasmuch as it would be a very difficult task to detect the position of the actual control rods, it has been the practice to detect the position of the drive rods which are affixedly coupled thereto and translate drive rod position into control rod location within the core of the reactor vessel.

A number of detectors have been used in the past to determine drive rod position. In one such detector a permanent magnet is located on top of the drive rod for movement therewith inside the rod travel housing. A series of reed switches and associated precision resistors are disposed outside the rod travel housing along its entire length, the resistors being connected in electrical series with each other. Movement of the drive rod, and hence the magnet, activates the reed switches as the magnetic flux of the magnet comes within range of the respective switches. The activation of a reed switch shorts out the associated precision resistor. A measurement of the impedance of the series connected resistors thus provides an indication of the rod position. A drawback of this detector is that a significant amount of magnetic flux is generated by the mechanism that lifts the rod, which totally disrupts the reed switches, giving rise to an erroneous reading of position indication. Also, the field of action of the magnetic flux of the magnet is not particularly well contained which could inadvertently actuate several adjacent switches simultaneously, which again leads to an erroneous reading.

In another known detector a permanent magnet is employed at the top of the drive rod as discussed above, however the reed switches and precision resistors are replaced with a conductive wire that is tightly strung along the side of the travel housing. A large current pulse is passed through the wire which causes the wire to twist under the action of a magnetomotive force at the zone at which the flux of the magnet passes through the wire. The twisting action propagates up the wire and induces a voltage pulse in a transducer located at the end of the wire. The time delay from the initiation of the current pulse in the wire to the occurrence of a voltage pulse by the transducer corresponds to the position of the magnet, and thus of the control rod. This detector has several disadvantages. Complicated mechanical means are required to damp the twisting action of the wire to prevent continuous oscillation thereof up and down the wire. In addition since the voltage pulse generated by the transducer is relatively small, it must be amplified by an immediate set of electronics which by necessity is located in a hostile environment of extremely high temperatures and radiation fields, leading to a high rate of failure of the detector electronics.

In a further known detector, a long single winding extends along the length of the rod travel housing and rod position is measured as a function of impedance changes in the winding as the position of drive rod changes within the rod travel housing. The impedance contributions of winding resistance, however, is not entirely predictable thus reducing the reliability of this type of detector.

An analog detector is known which avoids many of the above drawbacks. This detector includes a plurality of layered, wound coils concentrically arranged in a stack and supported by a nonmagnetic stainless steel tubular substructure that is slid over the nonmagnetic rod travel housing. The coils are arranged alternately as primary and secondary coils, with all the primary coils connected in series and all the secondary coils connected in series. The coils form, in effect, a long linear voltage transformer distributed over the height of the travel housing such that the coupling from primary to secondary is affected by the extent to which the magnetic drive rod penetrates the coil stack. Rod position is determined by applying a constant sinusoidal excitation current to the primary and measuring the voltage induced across the secondary. The magnitude of the induced secondary voltage corresponds to rod position.

The primary advantages that the transformer type of detector provides over the other detectors are: (1) there is no requirement for a permanent magnet on top of the drive rod and within the primary coolant; (2) there is no active circuitry required within the hostile environments of either the containment building or reactor head area; and (3) when the primary is excited by a precision current source and the secondary voltage is sensed with a high input impedance so that little current actually flows through the secondary, then the less predictable contributions of winding resistance and leakage inductance can be ignored. The transformer type of detector, however, has an accuracy problem in that the secondary voltage drifts with changes in the operating conditions of the reactor. A primary source of this drift has been traced to changes in the permeability and resistivity of the drive rod with variations in drive rod temperature. This problem requires frequent recalibration which is both tedious and time consuming and often resulting in delayed operation of the reactor.

U.S. Pat. Nos. 3,846,771 and 3,893,090, each describe a detector employing digital techniques which is more accurate than any of the foregoing detectors and avoids many of the above drawbacks. The digital detector, however, is expensive, which is a particularly important factor when consideration is given to repairing or improving an existing detector vis-a-vis total replacement thereof. For example, in a situation where the transformer type detector has been installed, it would be preferable if a relatively inexpensive means could be devised to compensate for drift, rather than replacing the detector and related electronics with the more expensive digital detector and its related electronics. In this way, the above noted advantages of the transformer type of detector are preserved and the expense of complete replacement is saved.

SUMMARY OF THE INVENTION

It is an object of the present invention to improve the accuracy of a rod position indication system.

It is a further object of the invention to improve the accuracy of a rod position indication system by compensation for drift in the output of a rod position indicator due to temperature variations in the drive rod.

The above and other objects are accomplished by the invention in which a method is provided for temperature compensating a position indicator which includes a sensor for producing an output signal whose magnitude corresponds to the position of an element that is linearly movable between first and second positions and which is subject to changes in temperature within a given temperature range and wherein the output signal of the sensor contains a temperature variable offset component and the rate of increase of the output signal as the element moves from the first to the second position fluctuates with changes in temperature. The method includes measuring the temperature of the medium; generating an electrical representation of an offset correction, relative to a reference temperature, required in the offset component of the output signal of the sensor at the temperature of the element; generating an electrical representation of a rate correction factor, relative to a reference temperature, required in the rate of increase in the output signal of the sensor at the temperature of the element; causing the sensor to produce an output signal corresponding to the position of the element; and, compensating the output signal of the sensor by forming an electrical representation of the product of the sensor output signal and the rate correction factor required at the temperature of the element, and adding to such product the offset correction required at the temperature of the element.

BRIEF DESCRIPTION OF THE DRAWINGS

FIG. 7 is a block circuit diagram of a circuit for implementing the method according to the invention.

FIG. 8 is a block circuit diagram of an alternative embodiment of a circuit for implementing the method according to the invention.

FIG. 9 is a block circuit diagram for implementing a further feature of the method according to the invention.

DESCRIPTION OF THE PREFERRED EMBODIMENT

Figure 1:
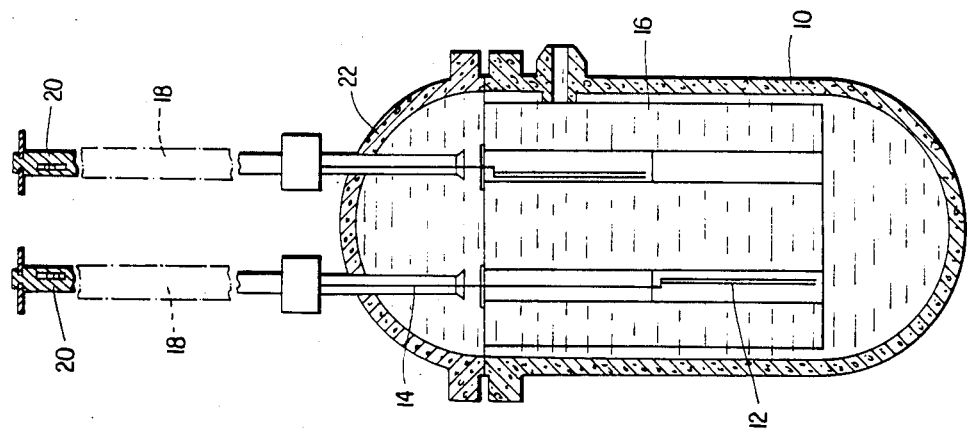
FIG. 1 is a schematic diagram of a nuclear reactor, including its control rod drive and a rod position indication system in connection with which the method according to the invention may be used.

Accurate knowledge of the position of the control rods in a nuclear reactor is essential for ensuring the safe and efficient operation of the reactor. As can be appreciated by referring to FIG. 1, the sensing of the position of the control rods within a pressurized water reactor is particularly difficult because of the necessity for maintaining the sealed integrity of the reactor pressure vessel 10. The control rods 12 and the drive rods 14, which are structurally coupled to their respective control rods 12, are surrounded with water 16 which completely fills the pressure vessel 10. Under normal operating conditions, the water is at a high temperature and is pressurized so that no boiling takes place.

The position of each control rod 12 is determined from measurements obtained from a sensing mechanism 18 placed outside the pressure vessel 10, because no mechanical penetrations of the pressure vessel 10 for purposes of control rod position sensing are permitted. The only area where the sensing mechanism 18 can be placed is along the rod travel housing 20. The drive rods 14 move within their respective rod travel housings 20, which are sealed pipes formed integral with and extending longitudinally upward from the head 22 of the reactor.

A sensing mechanism 18 placed along the rod travel housing 20 can only sense the position of the drive rod 14. However, it is normally assumed that the fastening of the control rod 12 to its respective drive rod 14 is reliable and therefore the displacement of the drive rod 14 and the control rod 12 are the same.

Figure 2:
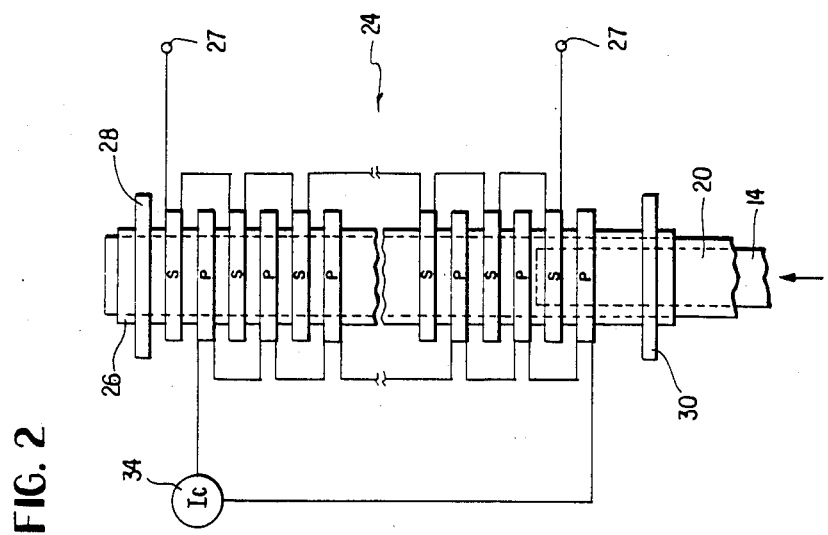
FIG. 2 is a schematic diagram of a rod position indicator with which the method according to the invention may be used.

FIG. 2 illustrates a rod position indicator 24 of the linear voltage transformer type described above with which the method of the present invention is particularly useful for compensating the indicator output for variations due to changes in rod temperature. It should be understood that the present method is not restricted in application to the linear voltage transformer indicator but rather may be used with other types of rod position indicators, including the one described above which employs a single long winding, the impedance of which varies as a function of rod position.

Referring to FIG. 2, indicator 24 includes a plurality of annular, layer-wound primary coils P which are electrically connected in series to form a primary winding, and a plurality of annular, layer-wound secondary coils S which are electrically connected in series to form a secondary winding. The coils are stacked in tandem and are mounted on a coil form 26 having end plates 28 and 30. Coil form 26 is comprised of a thin nonmagnetic stainless steel tubular substructure that is slid over the nonmagnetic rod travel housing 20 which encloses the drive rod 14. The secondary coils S are alternately interleaved and inductively coupled with the primary coils P, with a secondary coil S located at the top of the coil stack and a primary coil located at the bottom of the coil stack.

In one illustrative configuration, the coil form 26 is approximately 393.7 cm long with a combined primary and secondary active coil length of approximately 384.81 cm. The active coil includes 72 layer-wound coils, half of which are primary coils P with the other half being secondary coils S alternately interleaved as discussed above. Each coil is 13.72 cm in diameter and approximately 5.08 cm high. The primary coils P are essentially identical while the secondary coils S preferably have progressively more turns near the bottom of the detector. A space of approximately 7.62 cm exists between the lowest primary coil P and the bottom end plate 30 of the coil form 26.

Coil form 26 is preferably mounted on rod travel housing 20 so that at least the top portion 32 of drive rod 14 penetrates the bottom portion of the core stack. A sinusoidal current source 34 is connected for exciting a current in the primary winding which induces a voltage across terminals 27 of the secondary winding.

Drive rod 14 is made of a metal having magnetic properties. As may be appreciated, as drive rod 14 moves up through its housing 20 the coupling between the primary and secondary windings increases which causes a proportional increase in the magnitude of the voltage induced in the secondary winding. The secondary voltage thus also corresponds to the position of the control rod as it is withdrawn from the core of the reactor.

While in theory the relationship between secondary voltage and rod position should be linear, in fact there are a number of variables which introduce error into the output of the secondary winding. For one thing, there is some coupling between primary and secondary windings even when there is minimum penetration of the coil stack by the drive rod. This residual coupling produces an offset voltage of approximately 9 volts. It has also been found that the configuration of the detector results in a nonlinear secondary voltage output which is overcome in part by the nonuniform distribution of secondary windings as noted above.

Through extensive evaluation it has been found that a major source of system error is introduced by variation in the temperature of the drive rod which is caused by changes in coolant temperature. The reason for this is that the permeability and resistivity of the drive rod are temperature dependent so that as the temperature of the drive rod changes, its permeability and resistivity also change which of course directly affects the coupling between the primary and secondary windings of the detector.

The travel of the control rod in a commercial reactor is measured in steps of 1.59 cm and normal rod travel is 228 steps. Coolant temperature can vary between a cold temperature of 32° C. at shutdown to an average temperature of 298° C.±7° C. under normal plant operating conditions.

Figure 3:
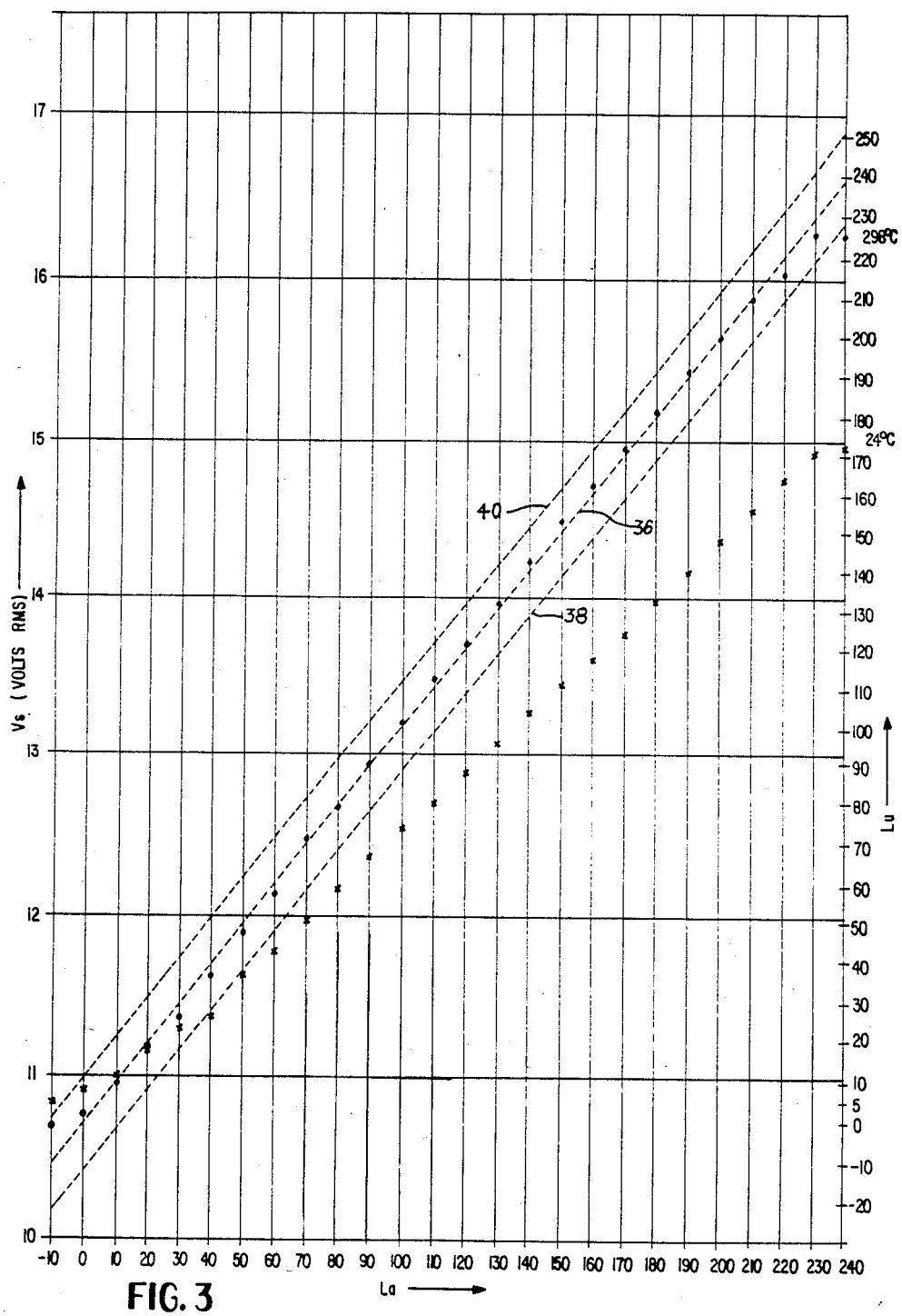
FIG. 3 is a graph illustrating the relationship between the secondary voltage output of the position indicator of FIG. 2 versus actual rod position at two different temperatures.

FIG. 3 illustrates the secondary voltage response Vs of a detector of the type illustrated in FIG. 2 without temperature compensation at 298° C. and at room temperature (24° C.) with the actual position La of the rod being moved from 0 to 228 steps. The best linear fit of the data at 298° C. is illustrated by the center dotted line 36. The required accuracy of the rod position system is ±5%, which corresponds to ±11.5 steps and this is indicated by the dotted lines 38 and 40 on either side of the best linear fit 36. Under these conditions, the error of the detector due to temperature sensitivity alone is between 20% and 40% of the allowed error budget depending on drive rod temperature at the time of calibration.

If, for example, the detector were calibrated at the normal hot operating temperature of 298° C., the performance at room temperature (24° C.) would exhibit errors of about 73 steps when the rod is at 228 steps. This is illustrated by the vertical axis on the right hand side of FIG. 3 which indicates the uncompensated rod position Lu in steps if the secondary voltage Vs of the detector were calibrated against actual rod position at 298° C.

Figure 4:
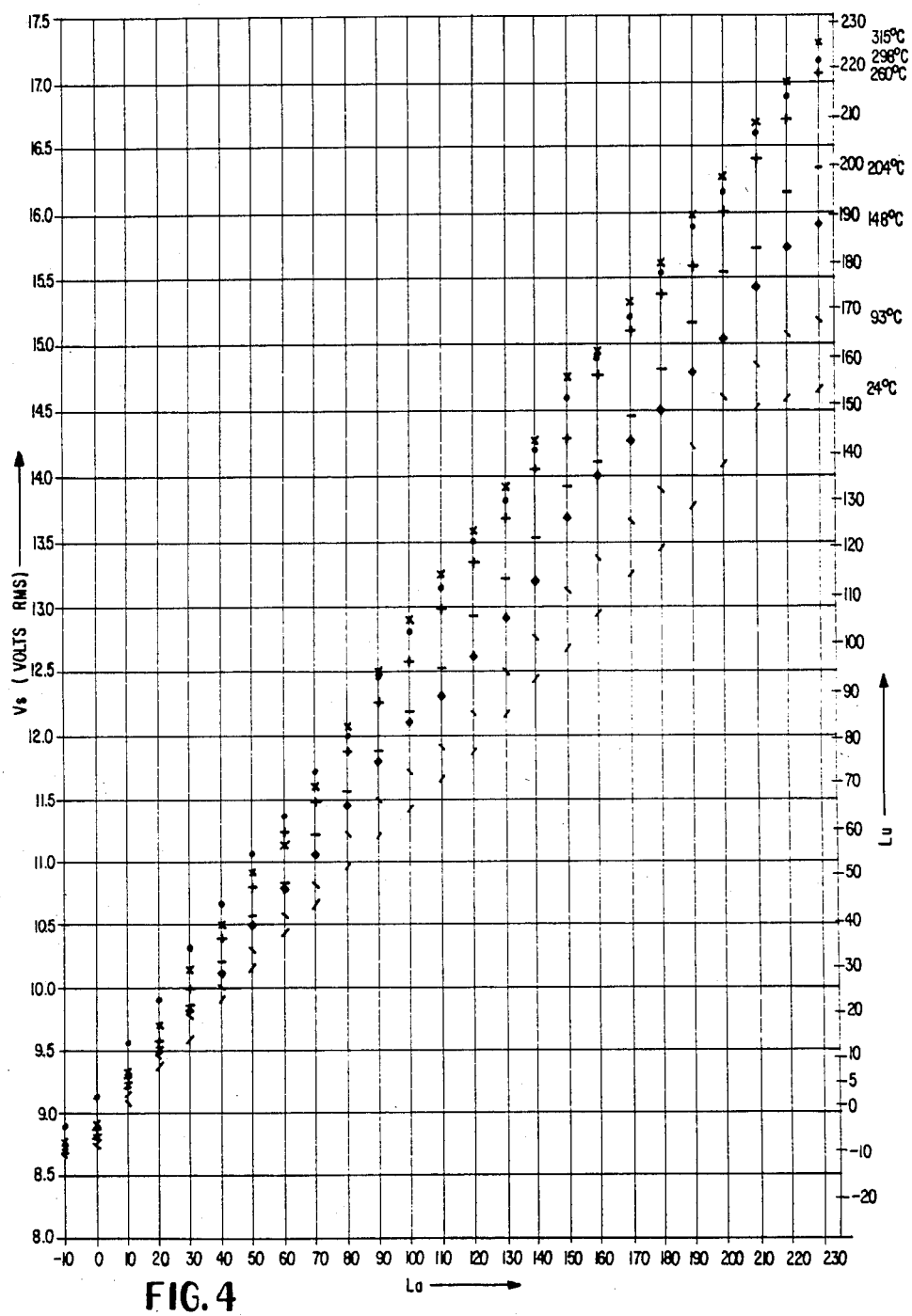
FIG. 4 shows a series of seven curves of secondary voltage output of the position indicator of FIG. 2 versus actual rod position at seven respective temperatures.

FIG. 4 is similar to FIG. 3 but illustrates the secondary voltage Vs response of the detector versus actual rod position La without temperature compensation at seven different temperatures. The righthand vertical axis in FIG. 4 is calibrated to indicate the uncompensated rod position Lu if the secondary voltage Vs were calibrated for best fit at 315° C.

Thus, for example at 315° C. a secondary voltage Vs of 14.75 volts corresponds to an actual rod position La of 150 steps. However, at room temperature (24° C.) an actual rod position La of 150 steps corresponds to a secondary voltage Vs of approximately 12.6 volts. If the secondary voltage were calibrated to the actual rod position La at 315° C., then 12.6 volts on the secondary would indicate an uncompensated (and erroneous) rod position Lu of only slightly less than 100 steps.

Obviously, either the secondary voltage of the detector has to be recalibrated each time the temperature of the coolant (and hence of the drive rod) changes, or some form of compensation for the errors caused by temperature has to be made.

The temperature of interest is that of the drive rod since it is the permeability and resistivity of the drive rod which varies in accordance with temperature and causes the secondary voltage to drift with temperature. U.S. patent application Ser. No. 606,422 filed concurrently and assigned to the present assignee, discloses an apparatus and a method utilizing a tertiary coil for producing a signal that is directly proportional to the temperature of the drive rod. While the tertiary coil output signal provides an accurate measurement of drive rod temperature, the addition of a tertiary coil on an already installed detector requires either the disassembly of the detector or the construction of a special tool for winding the tertiary coil in place on the coil form.

As an alternative to measuring the drive rod temperature in a direct manner, indirect measurements are possible by using either detector coil temperature, which is determined by coil resistance, or measuring the average coolant temperature. Of these, average coolant temperature is considered the most reliable measurement since it is not affected by other variables such as cooling air flow over the detector. Average coolant temperature could be used to correct 41.5% of the error in the slope (rate of increase) of the curves illustrated in FIGS. 3 and 4 and an additional 6 steps of offset to the indicated value as the temperature changes from 315° C. to 24° C.

According to the invention a method is provided for using the temperature of the drive rod, however it may be determined, for compensating the output of a rod position indicator whose output fluctuates with changes in temperature. Thus, while the present invention makes it possible to utilize the average temperature of the coolant, if a more direct measurement of the temperature of the drive rod is available, such a measurement could obviously be used with the present method with even better results.

As noted above regarding the rod position indicator of FIG. 2, there is a residual coupling between the primary and secondary windings even when there is minimum penetration of the coil stack by the drive rod. The voltage induced across the secondary winding thus includes an offset component which is always present. This can be observed in FIGS. 3 and 4 wherein each of the curves cross the Vs axis at a positive voltage in the range of 8.5 to 11 volts. As shown in FIGS. 3 and 4 this offset voltage varies with temperature. If the secondary voltage Vs were calibrated against the actual rod position La at a hot temperature of 315° C. then it can be appreciated from FIG. 4 that it would be necessary to adjust upwardly the offset voltage of the data obtained at the respective other lower temperatures. Additionally, when the secondary voltage is calibrated hot to 315° C., in order for the secondary voltage to reflect the actual rod position La at a lower temperature, it is necessary to increase the slope of the curves formed by the data at the lower temperatures.

Figure 5:
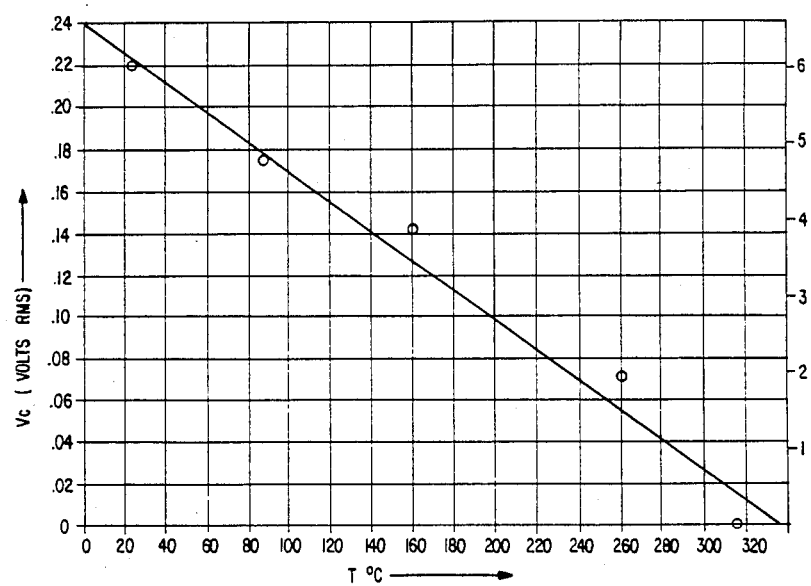
FIG. 5 is a graph showing the correction required in the offset voltage of the secondary voltage output signal of the position detector of FIG. 2 at respective rod temperatures.

FIG. 5 is a graph showing the changes in the secondary offset voltage required at each temperature within the temperature range of a selected drive rod. This data was obtained by applying a 200 ma (rms), 60 hertz signal to the primary winding of the rod position indicator of FIG. 2 and measuring changes in the secondary voltage using 315° C. as the reference temperature. As can be seen the required change in secondary voltage offset is essentially a linear relationship with temperature. Therefore, it is actually only necessary to take measurements at two different temperatures to establish the relationship between the change in secondary voltage offset versus temperature throughout the entire temperature range of the drive rod. Since this relationship is linear the required change in offset voltage Vc may expressed as a first order equation i.e. $Vc = A - B \times (Temp°C.)$. For the data of FIG. 5 which is exemplary only, $A = 0.2434$ and $B = 0.00072$.

Figure 6:
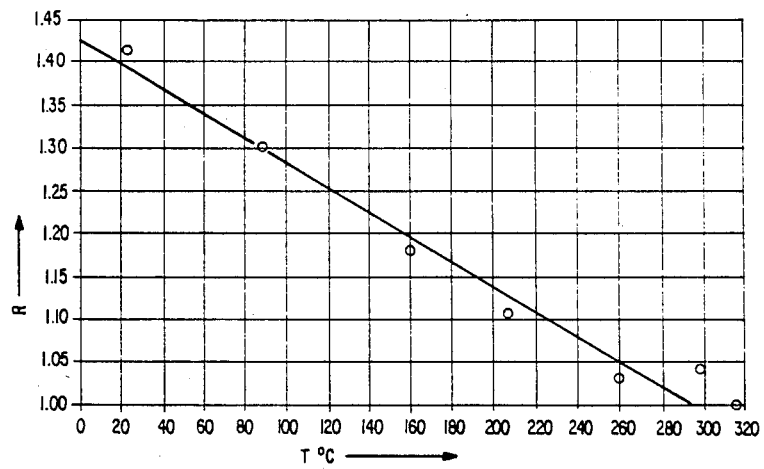
FIG. 6 is a graph showing the correction required in the rate of increase of the secondary voltage output signal of the position indicator of FIG. 2 as the rod is moved between first and second positions at respective rod temperatures.

Similarly, FIG. 6 is a graph showing the rate (slope) correction factor R (also known as gain correction factor) required in the rate of increase in the secondary voltage output at each temperature within the temperature range of a selected drive rod in order that the output of the rod position indicator accurately reflect rod position. The data shown in FIG. 6 was obtained in a similar manner as the data in FIG. 5 using 315° C. as a reference temperature. As can be seen the best fit also results in a linear relationship between the rate correction factor R and drive rod temperature which may be expressed as follows: $R = C - D \times (Temp.°C.)$. For the data in FIG. 6 which again is only exemplary, $C = 1.432536$ and $D = 0.001478$. As in FIG. 5, in order to establish the relationship between the rate correction factor and drive rod temperature over the entire temperature range of the drive, only two measurements at respectively different temperatures need be made. Preferably the two temperatures at which measurements are taken to form the curves of FIGS. 5 and 6 should be at or near the extreme temperatures of the known temperature range of the drive rods.

FIG. 7 illustrates an analog circuit for compensating the secondary voltage Vs of rod position indicator 24 for changes in drive rod temperature using the relationships of FIGS. 5 and 6. A temperature sensor 50 provides a voltage representing the temperature of the drive rod which is fed to a first amplifier inverter 52 having a gain of D. The output of amplifier inverter 52 is fed to an adder 54 where it is summed with a voltage C obtained from voltage divider 56. The output of adder 54 is the rate correction factor R which is used to adjust the gain of amplifier 58 for correcting the rate of secondary voltage Vs.

The output of temperature sensor 50 is also fed to an amplifier 60 having a gain of B. The output of amplifier 60 is fed to an added 62 where it is summed with a voltage A obtained from voltage divider 63. The output of adder 62 comprises the offset correction Vc which is added via adder 64 to the output of amplifier 58 to produce a temperature compensated output signal which represents the actual rod position. Thus, in accordance with the invention the temperature measurement obtained by temperature sensor 50 is used to adjust the rate and the offset of the secondary voltage output of rod position indicator 24 to produce a temperature compensated signal which represents the position of the rod with greater accuracy.

FIG. 8 illustrates another circuit for implementing the method according to the invention. In FIG. 8 the output of temperature sensor 50 is converted to a digital signal in analog to digital converter 66, the output of which is used to access a rate correction PROM 68 which has stored therein data corresponding to the curve illustrated in FIG. 6. The output of analog to digital converter 66 is also used to access the offset correction PROM 70 which contains data corresponding to the curve shown in FIG. 5. The data contained in rate correction PROM 68 and offset correction PROM 70 are obtained during a calibration process similar to that described above in connection with FIGS. 5 and 6. The output of rate correction PROM 68 is fed via digital to analog converter 72 to the gain control input of amplifier 58 and the output of offset correction PROM 70 is fed via digital to analog converter 74 to adder 64 and summed with the output of amplifier 58. As in FIG. 7, the output of adder 64 is a temperature compensated signal which represents the position of the rod with greater accuracy.

It should be understood the rod position indicator associated with each rod in the reactor must be separately calibrated to obtain offset correction and rate correction factor curves for each rod. However, the calibration process is greatly facilitated in accordance with the invention wherein, in order to obtain these calibration curves, data points at only two different temperatures need to be obtained to establish the relationships shown in FIGS. 5 and 6.

As noted earlier, the position indicator of FIG. 2 has a certain degree of nonlinearity, independent of the change in permeability and resistivity of the drive rod, which is overcome in part by the nonuniform distribution of secondary windings. According to a further aspect of the invention the linearity of the indicator is further improved by the provision of a series of look-up tables which are formed during a calibration process. A single set of look-up tables obtained from the calibration of a single indicator may be employed for this purpose, since the nonlinearities being dealt with here are common to each detector. The temperature range of the indicator is divided into temperature zones and a look-up table is generated during calibration for each zone to provide a linearity correction in that zone.

FIG. 9 shows a circuit for implementing this aspect of the invention. The signal from temperature sensor 50 is converted to digital form by analog to digital converter 76 and fed to a decoder 78 which provides a plurality of outputs which correspond to a respective one of the temperature zones. Decoder 78 thus selects the appropriate PROM 80 which contains the look-up table for the temperature zone within which the drive rod temperature falls.

The temperature compensated output of adder 64 is converted to a digital signal by analog to digital converter 82 and fed to each of the PROMS 80. The selected PROM 80 reads out the linearity correction at the temperature compensated rod position indicated by the signal from adder 64. The output from the selected PROM 80 is added by digital adder 84 to the temperature compensated rod position signal which has been digitized by analog to digital converter 82 to provide a rod position indication signal at digital adder output 86 of still greater accuracy.

It will be understood that the above description of the present invention is susceptible to various modifications, changes and adaptations, and the same are intended to be comprehended within the meaning and range of equivalence of the appended claims.

We claim:

1. A method for temperature compensating a position indicator which includes a sensor for producing an output signal whose magnitude corresponds to the position of an element that is linearly movable between first and second positions and which is subject to changes in temperature within a given temperature range, wherein the output signal of the sensor contains a temperature variable offset component and the rate of increase of the output signal as the element moves from the first to the second position fluctuates with changes in temperature, comprising the steps of:
   monitoring the temperature of the element;
   generating an electrical representation of an offset correction, relative to a reference temperature, required for the offset component of the output signal of the sensor at the temperature of the element;
   generating an electrical representation of a rate correction factor, relative to a reference temperature, required for the rate of increase in the output signal of the sensor at the temperature of the element;
   causing the sensor to produce an output signal corresponding to the position of the element; and
   compensating the output signal of the sensor by forming an electrical representation of the product of the sensor output signal and the rate correction factor required at the temperature of the element, and adding to such product the offset correction required at the temperature of the element.

2. The method according to claim 1, wherein said offset correction generating step includes providing a representation of the offset correction required at two different temperatures and deriving the offset correction required at other temperatures within the given temperature range by interpolation; and said rate correction factor generating step includes providing a representation of the rate correction factor required at two different temperatures and deriving the rate correction factors required at the other temperatures within the given temperature range by interpolation.

3. The method according to claim 2, wherein the two different temperatures of said offset correction generating step and said rate correction factor generating step are near the extreme low and high temperatures of the given temperature range.

4. The method according to claim 1, including the additional steps of generating electrical representations of linearity corrections required in different temperature zones of the given temperature range to the position indicated by the output signal of said compensation step, and adding to the output signal of said compensating step the linearity correction corresponding to the temperature zone within which the temperature of the element is located and to the position indicated by the output signal of said compensating step.

* * * * *